UNITED STATES PATENT OFFICE.

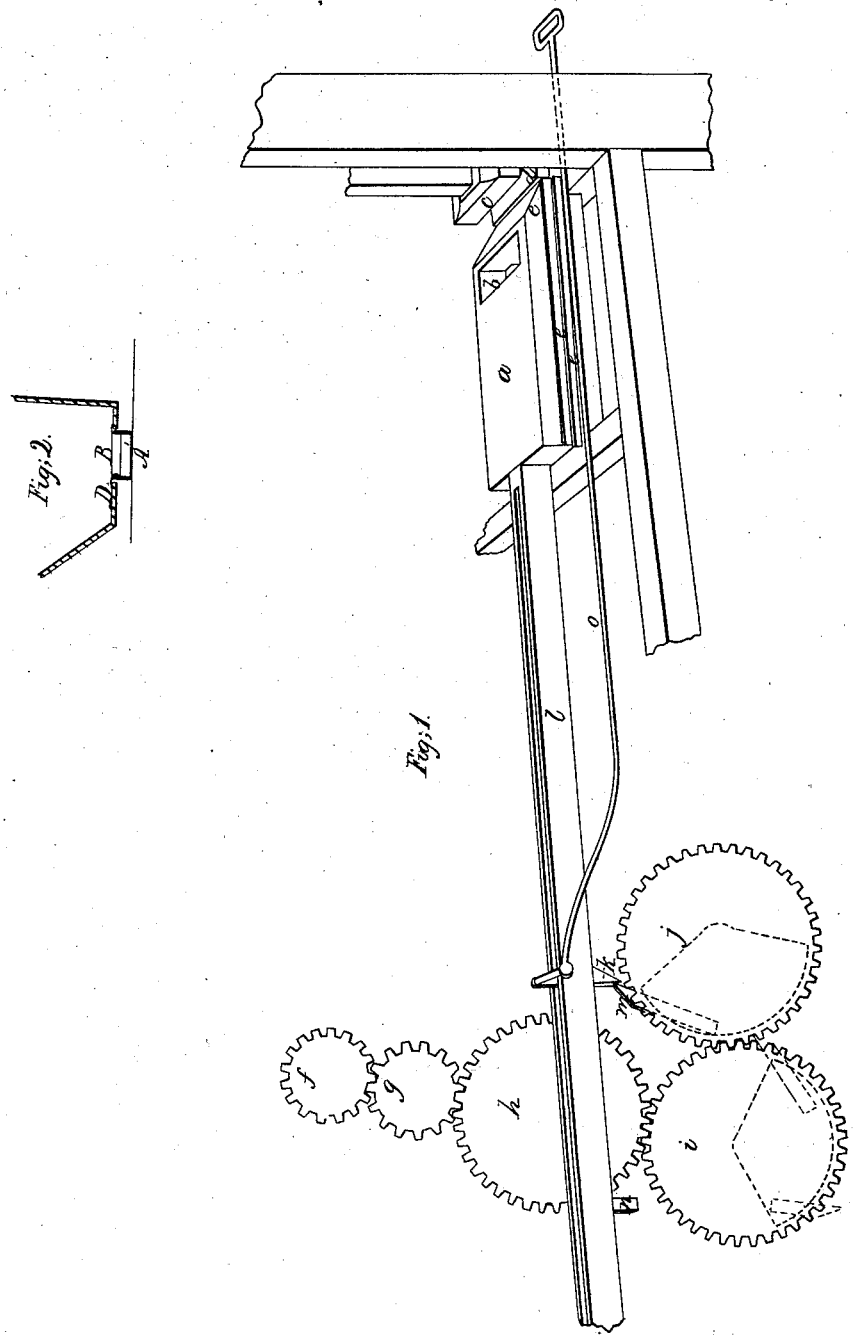

NATHAN SAWYER AND THOS. W. SMITH, OF WASHINGTON, DISTRICT OF COLUMBIA.

BRICK-PRESS FOR PRESSING BRICKS FROM DRY CLAY.

Specification of Letters Patent No. 881, dated August 13, 1838.

*To all whom it may concern:*

Be it known that we, NATHAN SAWYER and THOMAS WILLIAM SMITH, of Washington, in the District of Columbia, have invented an improvement in the manner of filling the molds and removing the pressed brick in those machines which are intended for pressing brick from dry clay, such as that for which Letters Patent were obtained by the said Nathan Sawyer on the 8th of April, 1835, but which may be applied to all machines for pressing brick from clay not made into mortar; and we do hereby declare the following to be a full and exact description thereof.

The object in view is to supply the pulverized clay to the mold, by means of a hopper, instead of by a shovel as ordinarily practised.

A sliding feeder $a$ which should be about two inches wider than the length of a brick, and about four inches thick, has a mortise or opening $b$, through it, every way larger than a brick, to allow more clay to enter the molds than is necessary to form the said brick. This feeder stands upon a suitable bed upon which it slides back and forth over the brick mold.

$c$, is the piston for pressing the brick, and $d$, a brick which has been pressed and raised to the top of the mold, ready for removal, as in Nathan Sawyer's press.

$e, e,$ are the guides between which the feeder slides.

The cog wheels $f, g, h, i, j,$ are employed for giving motion to the feeder, with the contrivance necessary for throwing it in and out of gear. The manner of gearing them will not require to be described, being sufficiently apparent.

A piece of iron or latch $k$, is attached to the shaft $l$, of the feeder. Upon the shaft of the wheel $j$ there is a catch ($m$) which revolving strikes against the latch $k$, and drives forward the feeder, but when the latch $k$, is turned down upon its pin, it will allow the catch $m$, to pass without acting upon it. The shaft of the wheel $i$, has on it a similar catch and as it turns in a direction opposite to that of $j$, it operates on a catch $n$, on the shaft $l$, and slides the feeder back. Any convenient number of feeders, placed either in one or two ranges, according to the compass of the machine, may be driven by this gearing, there being suitable plates, or arms, with latches, upon the shafts of the wheels. The rod $o$, which is represented as extending from an arm on the upper end of the catch $k$, passes on to the front of the machine, where it has a loop, or handle, to enable the person in attendance to stop the feeder.

The hopper is placed so that its mouth will be very near the feeder, which when drawn back will have the mortise $b$, directly under the mouth of the hopper, which fills the cavity with clay.

To prevent the obstruction which might arise from the clay passing between the hopper and the feeder, I place a box within the mouth of the hopper as represented in section at A, Figure 2. This box is open at top and bottom, to allow the clay from the hopper to pass through, and has the bottom resting upon the feeder. A piece of strong cloth, or leather, as shown at B, is attached to the inside of the upper edge of this box, and brought over and attached to the inside of the hopper, D, but left sufficiently loose to allow the box to pass freely up and down over the uneven surface of the feeder.

When, as represented in Fig. 1, the feeder is forced forward it stands directly over the mold, into which the clay consequently falls, and where it is pressed. The feeder as it advances pushes the pressed brick forward, and as it retreats it removes all superfluous clay from the mold, having a curved projection on its lower side, to give the concave surface to the clay, in accordance with the form of the mold, as described by said Nathan Sawyer in the specification of his patent before named. The front end of the feeder $q$, is sloped off to allow of the partial descent of the piston as it is withdrawn.

What we claim as our invention and improvement is—

1. The whole arrangement of the feeder, taking its supply from a hopper, supplying the mold, and removing the pressed brick, as set forth.

2. We also claim the application of the box, within the hopper, and which is attached to the hopper by cloth, or leather passed loosely over the top of the box to allow said box to pass freely up and down over the surface of the feeder, as described, and although we do not intend to confine ourselves to the particular arrangement of the gearing and its appendages, for operating the feeders, we do claim the particular arrangement thereof, and its application to the purpose expressed.

N. SAWYER.
    THOS. W. SMITH.

Witnesses:
 LINTON THORN,
 W. THOMPSON.